US007227593B2

United States Patent
Lee et al.

(10) Patent No.: US 7,227,593 B2
(45) Date of Patent: Jun. 5, 2007

(54) APPARATUS FOR PREVENTING AUTO-CONVERGENCE ERROR IN PROJECTION TELEVISION RECEIVER

(75) Inventors: Chung Hee Lee, Chung-gu Daegu (KR); U Hyun Kim, Gumi-si (KR)

(73) Assignee: LG Electronics Inc., Seoul (KR)

( * ) Notice: Subject to any disclaimer, the term of this patent is extended or adjusted under 35 U.S.C. 154(b) by 434 days.

(21) Appl. No.: 10/828,554

(22) Filed: Apr. 21, 2004

(65) Prior Publication Data

US 2005/0018090 A1 Jan. 27, 2005

(30) Foreign Application Priority Data

Apr. 22, 2003 (KR) ...................... 10-2003-0025412

(51) Int. Cl.
- H04N 3/22 (2006.01)
- H04N 3/26 (2006.01)
- H04N 17/00 (2006.01)
- H04N 17/02 (2006.01)

(52) U.S. Cl. ...................... 348/745; 348/177; 348/180; 348/184; 348/189; 348/806

(58) Field of Classification Search ................ 348/177, 348/180, 184, 189, 745, 747, 806–807; H04N 17/00, H04N 17/02, 3/22, 3/26
See application file for complete search history.

(56) References Cited

U.S. PATENT DOCUMENTS

| | | | | |
|---|---|---|---|---|
| 5,532,764 A | * | 7/1996 | Itaki ........................... 348/745 |
| 5,872,593 A | * | 2/1999 | Kawashima ................ 348/181 |
| 5,883,476 A | * | 3/1999 | Noguchi et al. ........ 315/368.12 |
| 5,898,465 A | * | 4/1999 | Kawashima et al. ........ 348/745 |
| 5,923,366 A | * | 7/1999 | Kawashima et al. ........ 348/190 |
| 6,057,881 A | * | 5/2000 | Kawashima et al. ........ 348/190 |
| 6,100,926 A | * | 8/2000 | Kawashima ................ 348/181 |
| 6,201,569 B1 | * | 3/2001 | Kawashima et al. ........ 348/190 |
| 6,252,626 B1 | * | 6/2001 | Buckley et al. .............. 348/189 |
| 6,297,859 B1 | * | 10/2001 | George ....................... 348/747 |
| 6,330,040 B1 | * | 12/2001 | Kawashima ................ 348/744 |
| 6,333,768 B1 | * | 12/2001 | Kawashima et al. ........ 348/806 |
| 6,496,231 B1 | * | 12/2002 | Pronkine ..................... 348/745 |
| 6,671,003 B1 | * | 12/2003 | George et al. .............. 348/745 |

(Continued)

FOREIGN PATENT DOCUMENTS

WO  WO 02/098142 A1  5/2002

Primary Examiner—Brian P. Yenke
(74) Attorney, Agent, or Firm—Ked & Associates, LLP (57) ABSTRACT

Disclosed is a video display an auto-convergence error in a projection television receiver (TV) capable of preventing generation of an error when an auto-convergence is performed. The apparatus includes a screen for displaying an image signal, first to eighth sensing units having first and second optical sensors for sensing a pattern displayed on the screen, first and second amplifying units for receiving and amplifying sensed values sensed by the first to fourth sensing units and the fifth to eighth sensing units with predetermined multiple amplification factors, first and second comparators for receiving and comparing amplified values outputted from the first and second amplifying units, an inverter for inverting output values of the first and second comparators, an operation unit for AND-gating the outputs of the amplifying units and outputs of the inverter, and a microcomputer for receiving an output of the operation unit, judging a degree of convergence correction, and outputting a corresponding control signal.

12 Claims, 6 Drawing Sheets

U.S. PATENT DOCUMENTS

6,750,921 B1* 6/2004 George .................. 348/745
7,001,023 B2* 2/2006 Lee et al. .............. 353/69
7,061,551 B2* 6/2006 Shim .................... 348/745
2003/0076450 A1* 4/2003 Lee et al. .............. 348/745
2003/0156229 A1* 8/2003 Samman et al. ........ 348/745

* cited by examiner

APPARATUS FOR PREVENTING AUTO-CONVERGENCE ERROR IN PROJECTION TELEVISION RECEIVER

BACKGROUND OF THE INVENTION

1. Field of the Invention

The present invention relates generally to a video display appliance, and more particularly, to an apparatus for preventing an auto-convergence error in a projection television receiver (TV) which prevents generation of an error when an auto-convergence is performed.

2. Description of the Related Art

Generally, diverse types of video display appliances including a small-sized analog television receiver (TV) to a large-sized projection TV of more than 60 inches have been provided to consumers.

Figure 1:
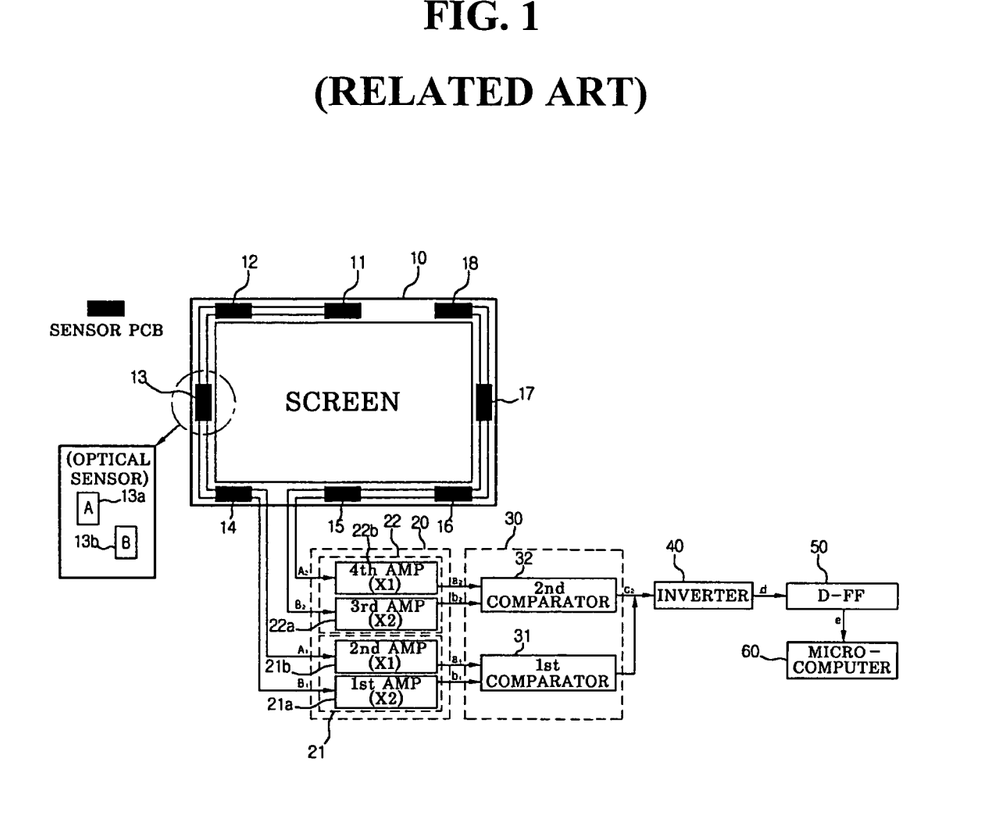
FIG. 1 is a block diagram illustrating the construction of a conventional convergence control apparatus in a projection TV.

A conventional apparatus for transmitting/receiving digital video data, as shown in FIG. 1, includes a transmitter part 100 which includes a video processor 102 and a digital-to-analog (DA) converter 104, and a receiver part 106 which includes an analog-to-digital (AD) converter 108 and a video processor 110.

A projection TV is an appliance which displays an image on a screen by projecting R, G, B colors on the screen using R, G, B Braun tubes, and its sensitivity items are W/U (White Uniformity), B/U (Bright Uniformity), convergence, focus, distortion, etc.

The convergence is to gather R (Red), G (Green), B (Blue) beams emitted from electron guns onto one spot on a screen by a magnetic field of a deflection yoke. If the electron beams are not properly deflected due to an abnormal operation of the deflection yoke or an influence of a magnetic field, a mis-convergence is generated, which deteriorates the color balance. That is, if the convergence is normally performed and the R, G, B beams accurately converge on a spot, an image of a white color is displayed. If a mis-convergence is generated, lines having colors of R, G, B may appear near by the image of the white color, and this deteriorates the picture quality.

Accordingly, in order to clearly display the image of the white color, the R, G, B beams should be gathered onto one spot, which is called an auto-convergence.

According to this auto-convergence, a specific pattern is produced on the screen, the degree of mis-convergence is detected using an optical sensor, and this mis-convergence is collected.

Hereinafter, a conventional convergence control apparatus for a projection TV will be explained with reference to the accompanying drawings.

Figure 2:
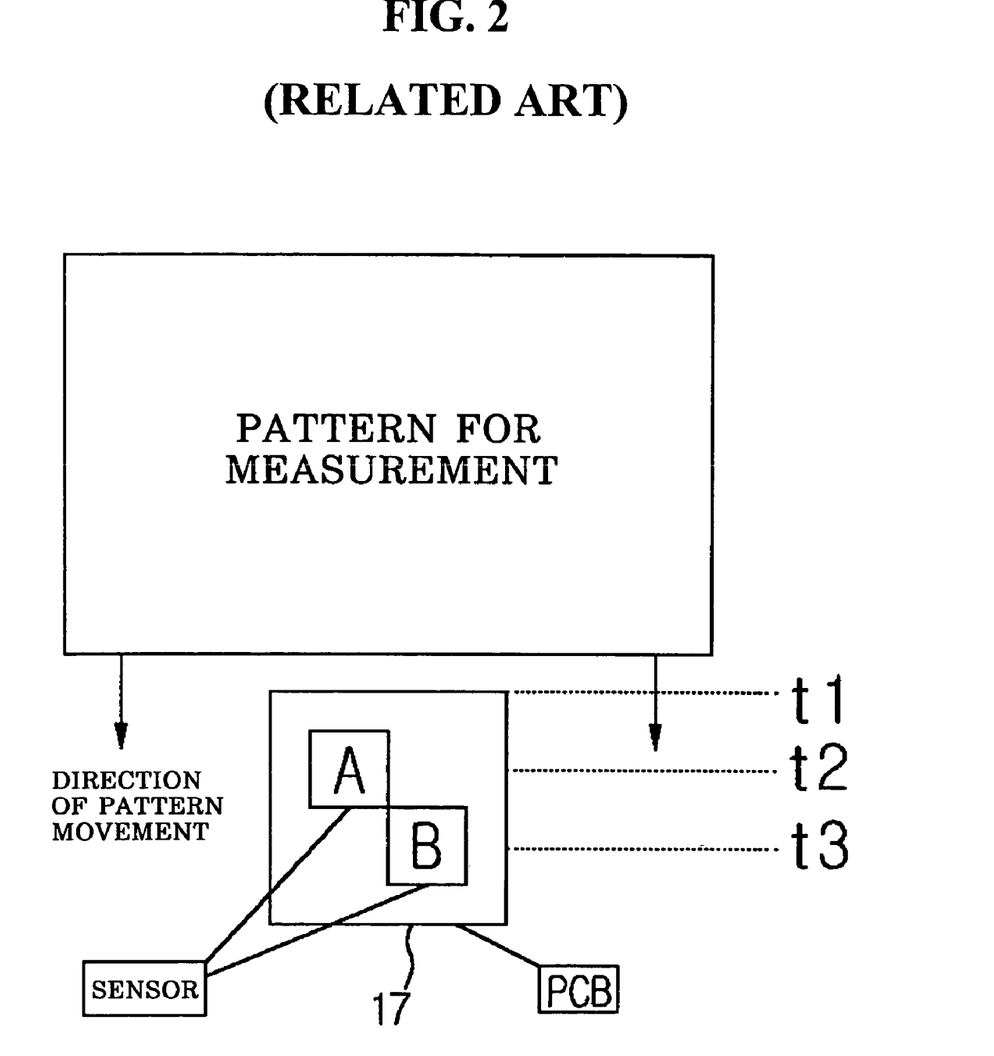
FIG. 2 is a view explaining a sensing method of an optical sensor according to the movement of a measurement pattern.
Figure 3:
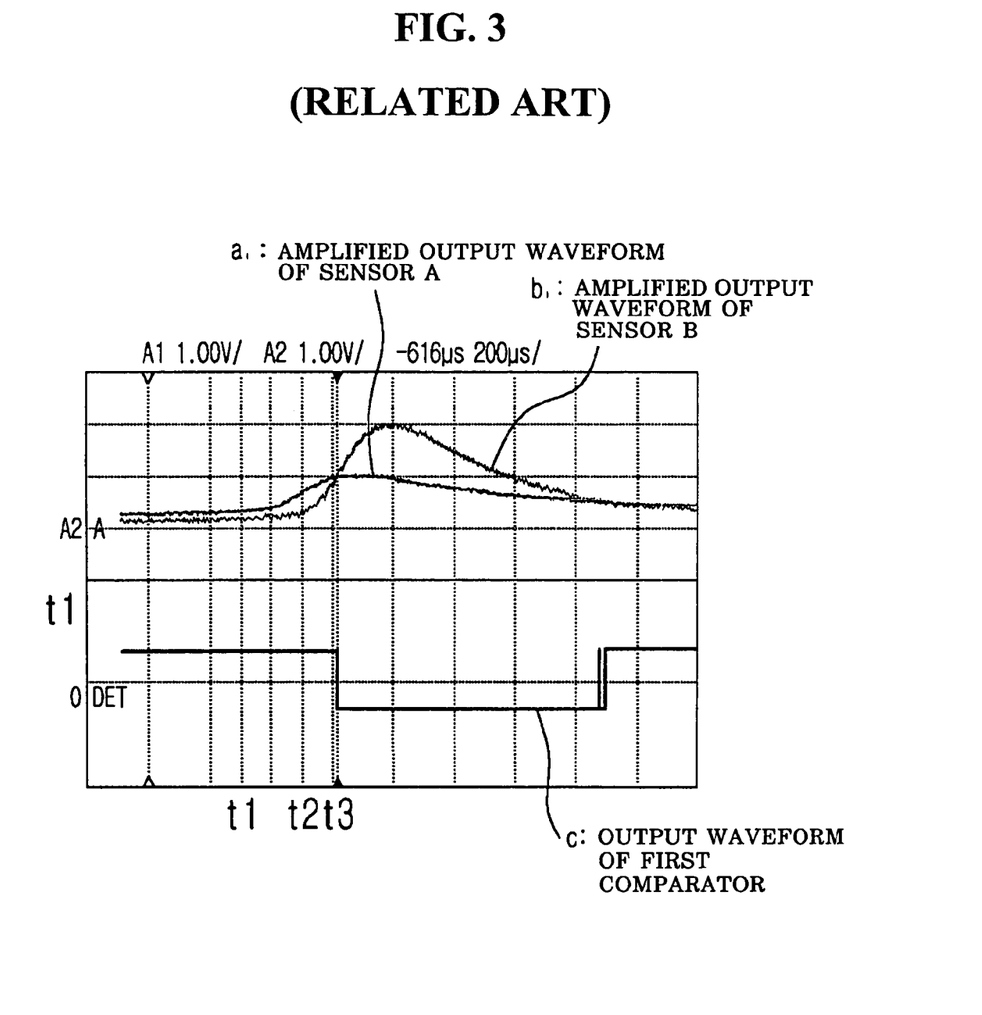
FIG. 3 is a waveform diagram illustrating an output waveform of an optical sensor according to the movement of the measurement pattern.

FIG. 1 is a block diagram illustrating the construction of a conventional convergence control apparatus in a projection TV. FIG. 2 is a view showing a sensing method for an optical sensor according to the movement of a measurement pattern, and FIG. 3 is a waveform diagram illustrating an output waveform of an optical sensor according to the movement of the measurement pattern.

The conventional convergence control apparatus in a projection TV, as shown in FIG. 1, includes a screen 10 for displaying an image signal, first to eighth sensing units 11 to 18 mounted in a specified area of the screen 10, an amplifying unit 20 for receiving and amplifying sensed values outputted from the first to eighth sensing units 11 to 18 with a predetermined amplification factor, a comparing unit 30 for receiving amplified values outputted from the amplifying unit 20 through inverting (−) terminals and non-inverting (+) terminals and comparing the inputted amplified values, an inverter 40 for inverting the output value of the comparing unit 30, a D-type flip-flop 50 for latching an output value of the inverter 40, and a microcomputer 60 for receiving data through the D-type flip-flop 50 and outputting a control signal for a convergence control.

The first, third, fifth and seventh sensing units 11, 13, 15 and 17 among the first to eighth sensing units are positioned in the middle parts of borders of the screen 10, and the second, fourth, sixth and eighth sensing units are positioned at the corners of the screen 10, respectively. Also, the sensing units 11 to 18 are classified into a first group composed of the first to fourth sensing units 11 to 14 and a second group composed of the fifth to eighth sensing units 15 to 18, and each of the first to eighth sensing units 11 to 18 includes first and second optical sensors A and B as shown in FIG. 2.

The amplifying unit 20 includes a first amplifying unit 21 for receiving and amplifying the sensed values outputted through the first optical sensors A and the second optical sensors B of the first to fourth sensing units 11 to 14, and a second amplifying unit 22 for receiving and amplifying the sensed values outputted through the first optical sensors A and the second optical sensors B of the fifth to eighth sensing units 15 to 18.

Here, the first amplifying unit 21 includes a first amplifier 21a for receiving and amplifying values sensed through the first optical sensors A of the first to fourth sensing units 11 to 14, and a second amplifier 21b for receiving and amplifying values sensed through the second optical sensors B of the first to fourth sensing units 11 to 14. The second amplifying unit 22 includes a third amplifier 22a for receiving and amplifying values sensed through the first optical sensors A of the fifth to eighth sensing units 15 to 18, and a fourth amplifier 22b for receiving and amplifying values sensed through the second optical sensors B of the fifth to eighth sensing units 15 to 18.

The comparing unit 30 includes a first comparator 31 for receiving and comparing output values of the first and second amplifiers 21a and 21b, and a second comparator 32 for receiving and comparing output values of the third and fourth amplifiers 22a and 22b.

The operation of the conventional convergence control apparatus for a projection TV will now be explained.

If an auto-convergence control mode is selected, the position of a pattern is sensed through the first to eighth sensing units 11 to 18. The sensed values outputted through the first optical sensors A of the first to eighth sensing units 11 to 18 are inputted to the second and fourth amplifiers 21b and 22b, and the sensed values outputted through the second optical sensors B of the first to eighth sensing units 11 to 18 are inputted to the first and third amplifiers 21a and 22 the amplification factor of which is twice the amplification factor of the second and fourth amplifiers 21b and 22b.

The amplified value b1 outputted through the first amplifier 21a is inputted to the inverting (−) terminal of the first comparator 31, and the amplified value a1 outputted through the second amplifier 21b is inputted to the non-inverting (+) terminal of the first comparator 31, so that a compared value c1 is outputted from the first comparator 31. Also, the amplified value b2 outputted through the third amplifier 22a is inputted to the inverting (−) terminal of the second comparator 32, and the amplified value a2 outputted through the fourth amplifier 22b is inputted to the non-inverting (+) terminal of the second comparator 32, so that a compared value c2 is outputted from the second comparator 31.

The output values of the first and second comparators 31 and 32 are AND-gated, and then inputted to the inverter 40.

The inverted value outputted through the inverter 40 is latched in the D-type flip-flop 50, and then inputted to the microcomputer 60.

Here, the sensing method according to the movement of the measurement pattern performed through the first to eighth sensing units 11 and 18 will be explained with reference to FIGS. 2 and 3.

If the pattern moves downwards in the case that the measurement pattern is red (or green or blue), the third sensing unit 13 performs the sensing process. As shown in FIG. 2, when the pattern is at a first sensing point t1, the pattern falls on neither of the first and second optical sensors A and B, and no light is sensed by both the first and second optical sensors A and B. In this case, low-level signals are applied to the first and second amplifiers 21a and 21b, and this causes low-level signals to be outputted from the first and second amplifiers 21a and 12b as shown in FIG. 3.

The low-level signals outputted from the first and second amplifiers 21a and 21b are inputted to the non-inverting (+) terminal and the inverting (−) terminal of the first comparator 31, and the first comparator 31 outputs a high-level signal. This is because several pull-up resistors are connected to the non-inverting (+) terminal of the first comparator 31.

Also, as shown in FIG. 2, if the pattern moves further and reaches a second sensing point t2, ½ of the pattern falls on the first optical sensor A, but no pattern falls on the second optical sensor B and no light is sensed by the second optical sensor B. In this case, the output value of the second amplifier 21b is larger than the output value of the first amplifier 21a, and thus the first comparator 31 continuously outputs a high-level signal.

If the pattern moves further and reaches a third sensing point t3, the pattern falls on the first optical sensor A in full, but ½ of the pattern falls on the second optical sensor B. In this case, the output value of the second amplifier 21b, which has received the sensed value of the first optical sensor A, becomes twice the output value of the first amplifier 21a, which has received the sensed value of the second optical sensor B (i.e., A=2B). However, since the amplification factor of the first amplifier 21a is twice the amplification factor of the second amplifier 21b, the output value of the first amplifier 21a is equal to the output value of the second amplifier 21b, and thus the first comparator 31 outputs a low-level signal thereafter.

In the same manner, the second comparator 32 outputs a low-level signal. The outputs of the first and second comparators 31 and 32 are AND-gated, and this AND-gated signal is inverted into a high-level signal through the inverter 40. This inverted high-level signal is inputted to the D-type flip-flop 50 as its clock so that the D-type flip-flop latches data, and then inputted to the microcomputer 60.

The microcomputer 60 judges the time point where its port goes from a low level to a high level as the third set position t3, judges the degree of the mis-convergence by measuring the distance from the initial position of the pattern to the third set position t3, and outputs a corresponding collection control signal.

The conventional auto-convergence error preventing apparatus in a projection TV, however, has the following problems:

First, if it is assumed that the pattern falls on the second set position t2 while the pattern is moved in order for any one of the optical sensing units mounted on the border of the screen to search for the third set position t3, the output of the comparator must be the high-level signal. However, if a surrounding light is inputted to other optical sensing units, the outputs of the corresponding comparators are varied, and this may cause the microcomputer to misrecognize the set position.

Second, if an external light is inputted to other sensing units besides the sensing unit subject to sensing, it affects the present sensing position, and it is difficult to measure the position accurately.

Third, as it is difficult to measure the position accurately, the convergence cannot be accurately controlled which deteriorates the picture quality.

SUMMARY OF THE INVENTION

The present invention is directed to an apparatus for preventing an auto-convergence error in a projection TV that substantially obviates one or more problems due to limitations and disadvantages of the related art.

It is an object of the present invention to provide an apparatus for preventing an auto-convergence error in a projection TV which can prevent in advance a sensing error that may be generated in a conventional auto-convergence control apparatus and provide a clear image of a high picture quality.

To achieve these objects and other advantages in accordance with the purpose of the invention, as embodied and broadly described herein, there is provided an apparatus for preventing an auto-convergence error in a projection television receiver (TV) provided with a screen for displaying an image signal and first to eighth sensing units having first and second optical sensors for sensing a pattern displayed on the screen, the apparatus comprising first and second amplifying units for receiving and amplifying sensed values sensed by the first to fourth sensing units and the fifth to eighth sensing units with predetermined multiple amplification factors, first and second comparators for receiving and comparing amplified values outputted from the first and second amplifying units, an inverter for inverting output values of the first and second comparators, an operation unit for AND-gating the outputs of the amplifying units and outputs of the inverter, and a microcomputer for receiving an output of the operation unit, judging a degree of convergence correction, and outputting a corresponding control signal.

Preferably, the operation unit comprises an XOR operation unit for receiving and XOR-gating signals inputted to non-inverting (+) terminals of the first and second comparators, and an AND gate for receiving and AND-gating an output of the XOR operation unit and the output of the inverter.

In another aspect of the present invention, there is provided an apparatus for preventing an auto-convergence error in a projection television receiver (TV) provided with a screen for displaying an image signal and first to eighth sensing units having first and second optical sensors for sensing a pattern displayed on the screen, the apparatus comprising a first amplifying unit for receiving and amplifying sensed values outputted through first optical sensors provided in the first to fourth sensing units and sensed values outputted through second optical sensors provided in the first to fourth sensing units, a second amplifying unit for receiving and amplifying sensed values outputted through first optical sensors provided in the fifth to eighth sensing units and sensed values outputted through second optical sensors provided in the fifth to eighth sensing units, a comparing unit for receiving and comparing amplified values outputted from the first and second amplifying units, an inverter for inverting output values of the comparing unit, a first operation unit for receiving and operating output values from all output terminals of the first and second amplifying units, a second operation unit for receiving and operating output values of the first operation unit and the inverter, and a microcomputer for outputting a control signal for a convergence control in accordance with an output of the second operation unit.

Preferably, the first amplifying unit comprises second, fourth, sixth and eighth amplifiers for receiving and amplifying the sensed values outputted through the first optical sensors in the first to fourth sensing units, and first, third, fifth and seventh amplifiers for receiving and amplifying the sensed values outputted through the second optical sensors in the first to fourth sensing units.

Preferably, the second amplifying unit comprises $10^{th}$, $12^{th}$, $14^{th}$ and $16^{th}$ amplifiers for receiving and amplifying the sensed values outputted through the first optical sensors in the fifth to eighth sensing units, and $9^{th}$, $11^{th}$, $13^{th}$ and $15^{th}$ amplifiers for receiving and amplifying the sensed values outputted through the second optical sensors in the fifth to eighth sensing units.

Preferably, the first operation unit receives and XOR-gates all the output values of the first and second amplifying units.

Preferably, the second operation unit comprises an AND gate for receiving and AND-gating the output values of the first operation unit and the inverter, and a D-type flip-flop for receiving an output of the AND gate, as its clock signal, and latching data.

In still another aspect of the present invention, there is provided an apparatus for preventing an auto-convergence error in a projection television receiver (TV) provided with a screen for displaying an image signal and first to eighth sensing units having first and second optical sensors for sensing a pattern displayed on the screen, the apparatus comprising a first amplifying unit for receiving and amplifying sensed values outputted through first optical sensors provided in the first to fourth sensing units and sensed values outputted through second optical sensors provided in the first to fourth sensing units, a second amplifying unit for receiving and amplifying sensed values outputted through first optical sensors provided in the fifth to eighth sensing units and sensed values outputted through second optical sensors provided in the fifth to eighth sensing units, first and second comparing units for receiving and comparing the sensed values of the first to eighth sensing units which are outputted from the first and second amplifying units, first and second inverter units for receiving and inverting all output values of the first and second comparing units, first and second latch units for receiving outputs of the first and second inverter units and latching data, and a microcomputer for receiving outputs of the first and second latch units and outputting a control signal for a convergence control.

Preferably, the first comparing unit comprises first to fourth comparators for receiving and comparing the sensed values of the first to fourth sensing units which are amplified through the first amplifying unit, and the second comparing unit comprises fifth to eighth comparators for receiving and comparing the sensed values of the fifth to eighth sensing units which are amplified through the second amplifying unit, Preferably, the first inverter unit comprises first to fourth inverters for inverting the outputs of the first comparing unit, and the second inverter unit comprises fifth to eighth inverters for inverting the outputs of the second comparing unit.

Preferably, the first latch unit comprises first to fourth D-type flip-flops for latching the output values of the first inverter unit, and the second latch unit comprises fifth to eighth D-type flip-flops for latching the output values of the second inverter unit.

Preferably, the microcomputer receives all the outputs of the latch units through its different ports, and outputs the control signal for the corresponding convergence control.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or similar parts.

Hereinafter, the construction and operation of the apparatus for preventing an auto-convergence error in a projection TV according to the present invention will be explained in detail with reference to the accompanying drawings.

Figure 4:
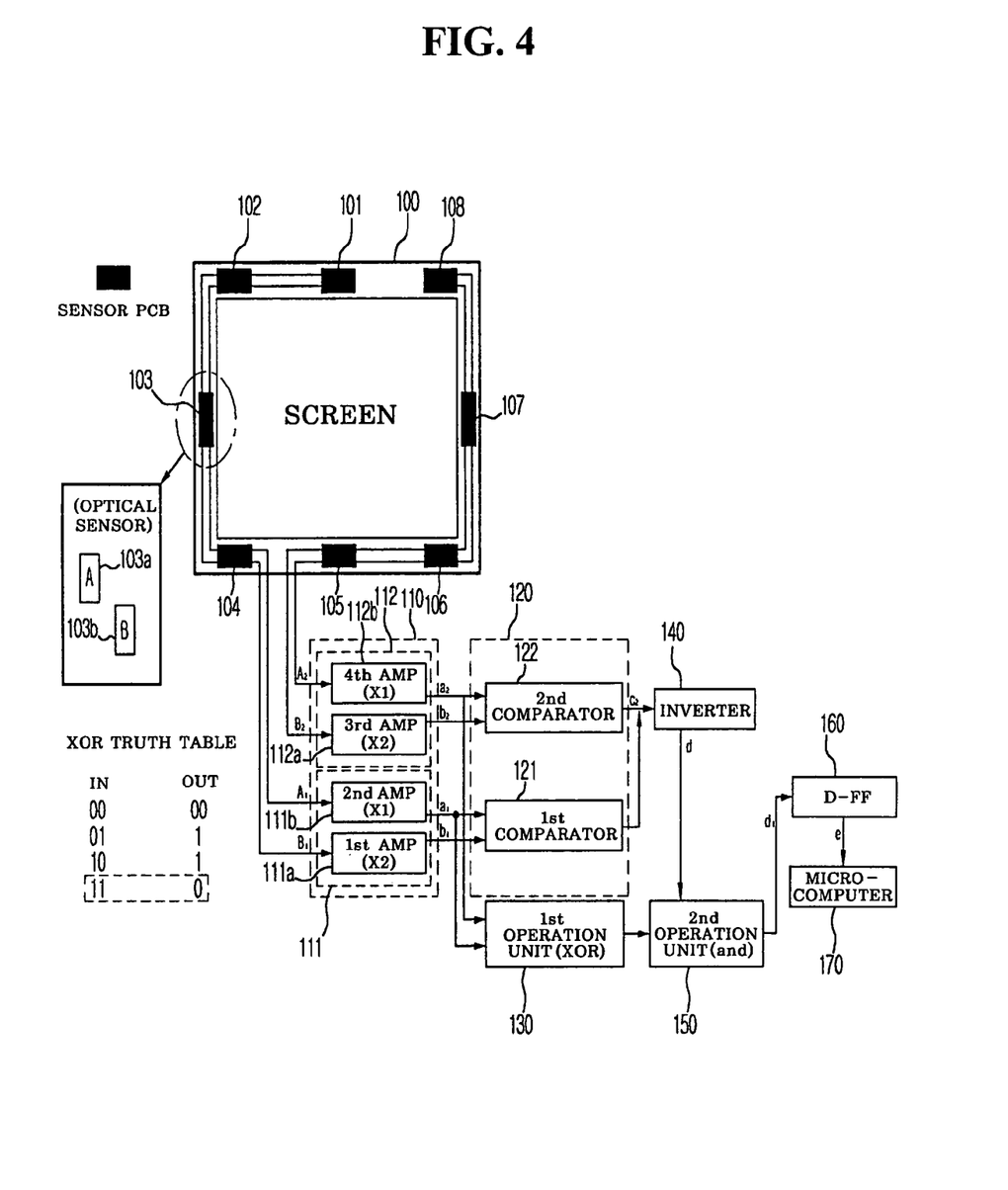
FIG. 4 is a block diagram illustrating the construction of an auto-convergence error preventing apparatus in a projection TV according to the present invention.
Figure 5:
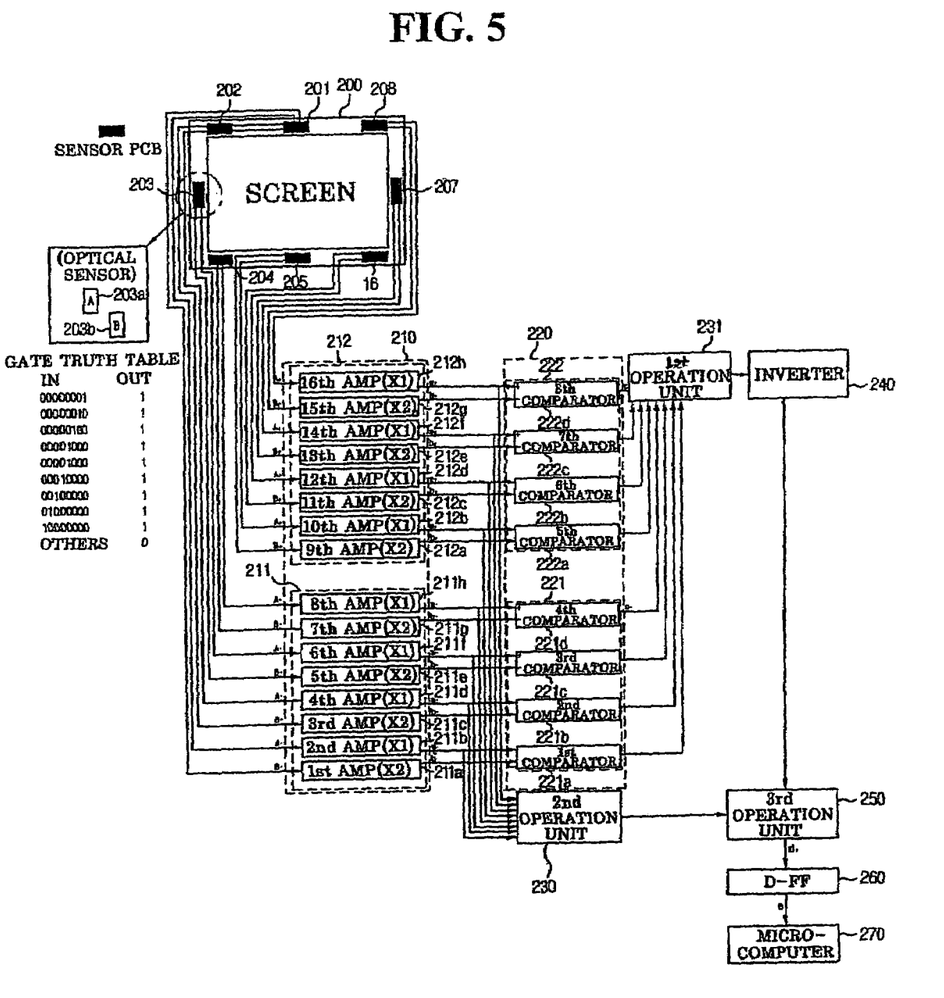
FIG. 5 is a block diagram illustrating the construction of an auto-convergence error preventing apparatus in a projection TV according to a first embodiment of the present invention.
Figure 6:
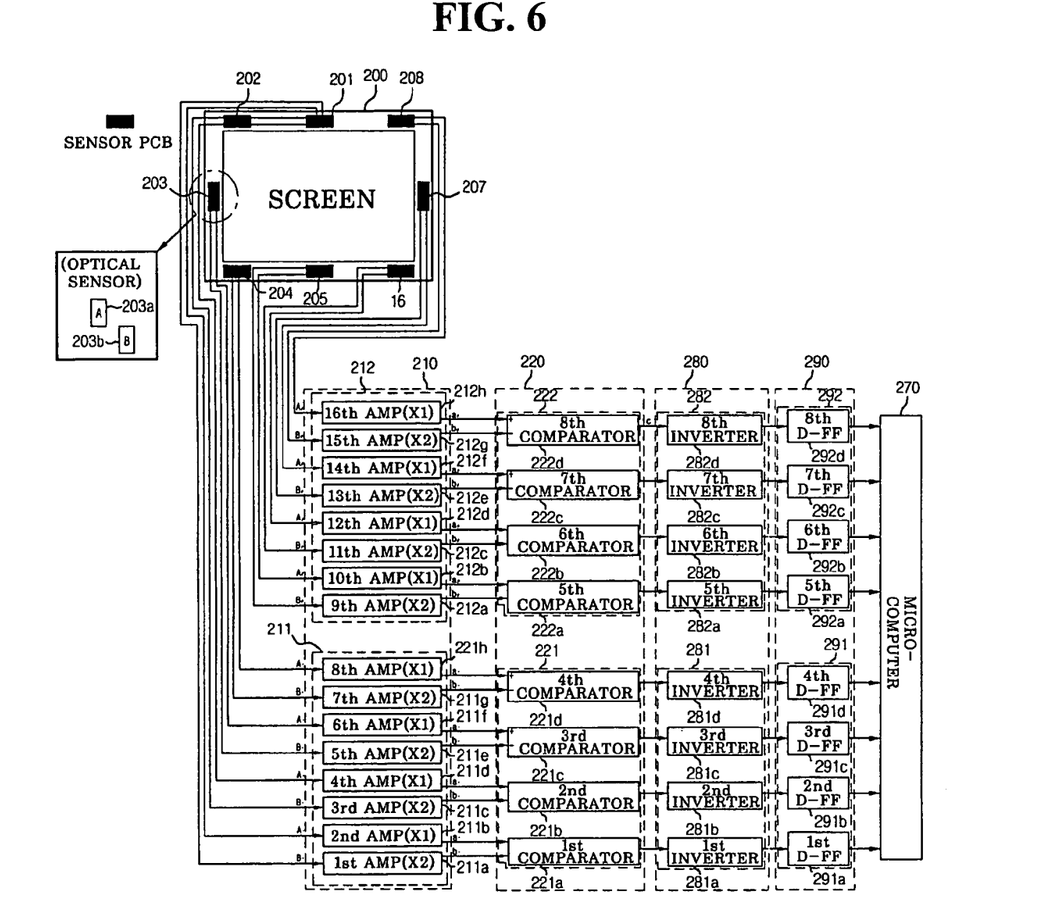
FIG. 6 is a block diagram illustrating the construction of an auto-convergence error preventing apparatus in a projection TV according to a second embodiment of the present invention.

FIG. 4 is a block diagram illustrating the construction of an auto-convergence error preventing apparatus in a projection TV according to the present invention. FIG. 5 is a block diagram illustrating the construction of an auto-convergence error preventing apparatus in a projection TV according to a first embodiment of the present invention, and FIG. 6 is a block diagram illustrating the construction of an auto-convergence error preventing apparatus in a projection TV according to a second embodiment of the present invention.

The auto-convergence error preventing apparatus in a projection TV according to the present invention, as shown in FIG. 4, includes a screen 100 for displaying an image signal, first to eighth sensing units 101 to 108, mounted in a predetermined area of the screen 100, for sensing a pattern displayed on the screen 100, an amplifying unit 110 for amplifying sensed values outputted through the first to eighth sensing units 101 to 108, a comparing unit 120 for receiving and comparing amplified values outputted from the amplifying unit 110, a first operation unit 130 for receiving and operating the signals inputted to non-inverting terminals of the comparing unit 120, an inverter 140 for inverting outputs of the comparing unit 120, a second operation unit 150 for receiving and AND-gating an output of the first operation unit 130 and an output of the inverter 140, a D-type flip-flop 160 for receiving an output of the second operation unit 150 as its clock and latching data, and a microcomputer 170 for outputting a control signal for a convergence control in accordance with the output value of the D-type flip-flop 160.

Here, each of the first to eighth sensing units 101 to 108, as shown in FIG. 4, is provided with first and second optical sensors A and B mounted on different positions. Also, the first to eighth sensing units 101 to 108 are classified into a first group composed of the first to fourth sensing units 101 to 104 and a second group composed of the fifth to eighth sensing units 105 to 108.

The amplifying unit 110 includes a first amplifying unit 111 for receiving and amplifying the sensed values outputted through the first and second optical sensors A and B of the first to fourth sensing units 110 to 104, and a second amplifying unit 112 for receiving and amplifying the sensed values outputted through the first and second optical sensors A and B of the fifth to eighth sensing units 105 to 108.

The first amplifying unit 111 includes a first amplifier 111a for receiving and amplifying the sensed values outputted through the second optical sensors B of the first to fourth sensing units 101 to 104, and a second amplifier 112b for receiving and amplifying the sensed values outputted through the first optical sensors A of the first to fourth sensing units 101 to 104.

The second amplifying unit 1 12 includes a third amplifier 112a for receiving and amplifying the sensed values outputted through the second optical sensors B of the fifth to eighth sensing units 105 to 108, and a fourth amplifier 112b for receiving and amplifying the sensed values outputted through the first optical sensors A of the fifth to eighth sensing units 105 to 188.

The comparing unit 120 includes a first comparator 121 for receiving and comparing output values of the first and second amplifiers 111a and 112b, and a second comparator 32 for receiving and comparing output values of the third and fourth amplifiers 112a and 112b.

The operation of the auto-convergence error preventing apparatus in a projection TV according to the present invention will now be explained with reference to the sensing method using the first and second optical sensors according to the movement of the pattern as illustrated in FIG. 2.

As shown in FIG. 2, if it is assumed that the pattern falls on the second set position t2 while the pattern is moved in order to search for the third set position t3 preset through the third sensing unit 103, the output of the fourth amplifier 112b is higher than the output of the third amplifier 112a even if an external light is inputted to the eighth sensing unit 108, and thus the second comparator 122 outputs a high-level signal. At this time, the output of the first amplifier 111a is equal to the output of the second amplifier 111b, and the first comparator 121 outputs a low-level signal.

Accordingly, the inverter 140 receives and inverts the low-level signal, which is a result of AND-gating the outputs of the first and second comparators 121 and 122, into a high-level signal, and the first operation unit 130 receives and XOR-gates the output value of the second amplifier 111b of the first amplifying unit 111 and the output value of the fourth amplifier 112b of the second amplifying unit 112.

At this time, the results of the XOR-gating are shown in Table 1 below.

TABLE 1

XOR Truth Table

| Input | Output |
|---|---|
| 00 | 0 |
| 01 | 1 |
| 10 | 1 |
| 11 | 0 |

If the inputs of the first operation unit 130 are identical with each other, a low-level signal is outputted from the first operation unit 130, while if the inputs are different from each other, a high-level signal is outputted from the first operation unit 130.

Accordingly, the first operation unit 130, which has received high-level signals outputted from the second amplifier 111b and the fourth amplifier 112b, outputs a low-level signal, and the second operation unit 150 AND-gates the low-level signal from the first operation unit 130 and the high-level signal outputted from the inverter 140 to output a low-level signal to the D-type flip-flop 160.

Consequently, the microcomputer 170 cannot receive the information as described above. Accordingly, even if an external light is inputted to other sensing units besides the sensing unit subject to sensing, the error generation is prevented in advance, and thus more accurate convergence control can be made.

First Embodiment

The auto-convergence error preventing apparatus in a projection TV according to the first embodiment of the present invention, as shown in FIG. 5, includes a screen 200 for displaying an image signal, first to eighth sensing units 201 to 208, mounted in a predetermined area of the screen 200, for sensing a pattern displayed on the screen 200, an amplifying unit 210 for amplifying sensed values outputted through the first to eighth sensing units 201 to 208, a comparing unit 220 for receiving and comparing amplified values outputted from the amplifying unit 210, a first operation unit 231 for receiving and AND-gating all output values of the comparing unit 220, a second operation unit 230 for receiving and operating the signals inputted to non-inverting terminals of the comparing unit 210, an inverter 240 for inverting outputs of the comparing unit 220, a third operation unit 250 for receiving and AND-gating an output of the second operation unit 230 and an output of the inverter 240, a D-type flip-flop 260 for receiving an output of the third operation unit 250 as its clock input and latching data, and a microcomputer 270 for outputting a control signal for a convergence control in accordance with an output value of the D-type flip-flop 260.

Here, the amplifying unit 210 includes a first amplifying unit 211 for receiving and amplifying sensed values outputted through first optical sensors A provided in the first to fourth sensing units 201 to 204 and sensed values outputted through second optical sensors B provided in the first to fourth sensing units 201 to 204, and a second amplifying unit 212 for receiving and amplifying sensed values outputted through first optical sensors A provided in the fifth to eighth sensing units 205 to 208 and sensed values outputted through second optical sensors B provided in the fifth to eighth sensing units 205 to 208.

The first amplifying unit 211 includes second, fourth, sixth and eighth amplifiers 211b, 211d, 211f and 211h for receiving and amplifying the sensed values outputted through the first optical sensors A provided in the first to fourth sensing units 201 to 204, and first, third, fifth and seventh amplifiers 211a, 211c, 211e and 211g for receiving and amplifying the sensed values outputted through the second optical sensors B provided in the first to fourth sensing units 201 to 204.

The second amplifying unit 212 includes $10^{th}$, $12^{th}$, $14^{th}$ and $16^{th}$ amplifiers 212b, 212d, 212f and 212h for receiving and amplifying the sensed values outputted through the first optical sensors A provided in the fifth to eighth sensing units 205 to 208, and $9^{th}$, $11^{th}$, $14^{th}$ and $15^{th}$ amplifiers 212a, 212c, 212e and 212g for receiving and amplifying the sensed values outputted through the second optical sensors B provided in the fifth to eighth sensing units 205 to 208.

The comparing unit 220 includes a first comparing unit 221 for comparing output values of the first amplifying unit 211, and a second comparing unit 222 for comparing output values of the second amplifying unit 212.

The first comparing unit 221 includes a first comparator 221a for receiving and comparing output values of the first and second amplifiers 211a and 211b, a second comparator 221b for receiving and outputting values of the third and fourth amplifiers 211c and 211d, a third comparator 221c for receiving and comparing output values of the fourth and sixth amplifiers 211e and 211f, and a fourth comparator 221d for receiving and comparing output values of the seventh and eighth amplifiers 211g and 211h.

The second comparing units 222 includes a fifth comparator 222a for receiving and comparing output values of the $9^{th}$ and $10^{th}$ amplifiers 212a and 212b, a sixth comparator 222b for receiving and outputting values of the $11^{th}$ and $12^{th}$ amplifiers 212c and 212d, a seventh comparator 222c for receiving and comparing output values of the $13^{th}$ and $14^{th}$ amplifiers 212e and 212f, and an eighth comparator 222d for receiving and comparing output values of the $15^{th}$ and $16^{th}$ amplifiers 212g and 212h.

Also, the first operation unit 231 receives and AND-gates all outputs of the comparing unit 220, and the second operation unit 230 receives and XOR-gates all outputs of the first to eighth comparators 221a to 221d and 222a to 222d. The inverter 240 receives and inverts an AND-gated output value outputted from the second operation unit 230, and the third operation unit 250 receives and AND-gates an output of the second operation unit 230 and an output of the inverter.

As described above, in the first embodiment of the present invention, the first to eighth comparators 221a to 221d and 222a to 222d are connected to the first to eighth sensing units 201 and 208, respectively, and the second operation unit 230 receives and XOR-gates the signals inputted to the non-inverting (+) terminals of the first to eighth comparators 21a to 21d and 222a to 222d.

At this time, the operation results of the second operation unit are shown in Table 2 below.

TABLE 2

| Truth Values | |
|---|---|
| Input | Output |
| 00000001 | 1 |
| 00000010 | 1 |
| 00000100 | 1 |
| 00001000 | 1 |
| 00010000 | 1 |
| 00100000 | 1 |
| 01000000 | 1 |
| 10000000 | 1 |
| Others | 0 |

As shown in Table 2, if only one of the signals inputted to the second operation unit 230 is a high-level signal, the second operation unit 230 outputs a high-level signal, while if plural signals inputted to the second operation unit 230 are high-level signals, the second operation unit 230 outputs a low-level signal.

In the first embodiment of the present invention, the first to $16^{th}$ amplifiers 21a to 211h and 212a to 212h and the first to eighth comparators 221a to 221d and 222a to 222d are provided in association with the first to eighth sensing units 201 to 208, and the second operation unit 230 XOR-gates the sensed values of the first optical sensors A of the first to eighth sensing unit 201 to 208, which are inputted to the non-inverting terminals of the first to eighth comparators 221a to 221d and 222a to 222d. Accordingly, even if the external light is inputted to other sensing units besides the sensing unit subject to sensing, the error can be intercepted through the second operation unit 230 and the third operation unit 250.

Second Embodiment

The auto-convergence error preventing apparatus in a projection TV according to the second embodiment of the present invention will be explained. In explaining the second embodiment, the same reference numerals are used for the same elements in FIG. 5.

The auto-convergence error preventing apparatus in a projection TV according to the second embodiment of the present invention, as shown in FIG. 5, includes a screen 200 for displaying an image signal, first to eighth sensing units 201 to 208, mounted in a predetermined area of the screen 200, for sensing a pattern displayed on the screen 200, an amplifying unit 210 for amplifying sensed values outputted through the first to eighth sensing units 201 to 208, a comparing unit 220 for receiving and comparing amplified values outputted from the amplifying unit 210, an inverter unit 280 for inverting outputs of the comparing unit 220, a latch unit 290 for receiving outputs of the inverter unit 280 as its clock inputs and latching data, and a microcomputer 270 for outputting a control signal for a convergence control in accordance with output values of the latch unit 290.

Here, the amplifying unit 210 includes a first amplifying unit 211 for receiving and amplifying sensed values outputted through first optical sensors A provided in the first to fourth sensing units 201 to 204 and sensed values outputted through second optical sensors B provided in the first to fourth sensing units 201 to 204, and a second amplifying unit 212 for receiving and amplifying sensed values outputted through first optical sensors A provided in the fifth to eighth sensing units 205 to 208 and sensed values outputted through second optical sensors B provided in the fifth to eighth sensing units 205 to 208.

The first amplifying unit 211 includes second, fourth, sixth and eighth amplifiers 211b, 211d, 211f and 211h for receiving and amplifying the sensed values outputted through the first optical sensors A provided in the first to fourth sensing units 201 to 204, and first, third, fifth and seventh amplifiers 211a, 211c, 211e and 211g for receiving and amplifying the sensed values outputted through the second optical sensors B provided in the first to fourth sensing units 201 to 204.

The second amplifying unit 212 includes $10^{th}$, $12^{th}$, $14^{th}$ and $16^{th}$ amplifiers 212b, 212d, 212f and 212h for receiving and amplifying the sensed values outputted through the first optical sensors A provided in the fifth to eighth sensing units 205 to 208, and $9^{th}$, $11^{th}$, $13^{th}$ and $15^{th}$ amplifiers 212a, 212c, 212e and 212g for receiving and amplifying the sensed values outputted through the second optical sensors B provided in the fifth to eighth sensing units 205 to 208.

The comparing unit 220 includes a first comparing unit 221 for comparing output values of the first amplifying unit 211, and a second comparing unit 222 for comparing output values of the second amplifying unit 212.

The first comparing unit 221 includes a first comparator 221a for receiving and comparing output values of the first and second amplifiers 211a and 211b, a second comparator 221b for receiving and outputting values of the third and fourth amplifiers 211c and 211d, a third comparator 221c for receiving and comparing output values of the fourth and sixth amplifiers 211e and 211f, and a fourth comparator 221d for receiving and comparing output values of the seventh and eighth amplifiers 211g and 211h.

The second comparing units 222 includes a fifth comparator 222a for receiving and comparing output values of the $9^{th}$ and $10^{th}$ amplifiers 212a and 212b, a sixth comparator 222b for receiving and outputting values of the $11^{th}$ and $12^{th}$ amplifiers 212c and 212d, a seventh comparator 222c for receiving and comparing output values of the $13^{th}$ and $14^{th}$ amplifiers 212e and 212f, and an eighth comparator 222d for receiving and comparing output values of the $15^{th}$ and $16^{th}$ amplifiers 212g and 212h.

The inverter unit 280 includes first to fourth inverters 281a to 281d for receiving and inverting outputs of the first to fourth comparators 221a to 221b, and fifth to eighth inverters 282a to 282d for receiving and inverting outputs of the fifth to eighth comparators 222a to 222d.

The latch unit 290 includes first to eighth D-type flip-flops 291a to 291d and 292a to 292d for receiving outputs of the first to eighth inverters 281a to 281d and 282a to 282d as their clock inputs, and latching data.

The microcomputer 270 receives output signals of the first to eighth D-type flip-flops 291a to 291d and 292a to 292d through its different ports, and outputs the control signal for controlling the corresponding convergence.

In the second embodiment of the present invention, unlike the first embodiment, the first to eighth inverters 281a to 281d and 282a to 282d and the first to eighth D-type flip-flops 291a to 291d and 292a to 292d are provided in association with the first to eighth comparators 221a to 221d and 222a to 222d, instead of the XOR operation unit and the AND gates provided in the first embodiment. Thus, the microcomputer 270 does not receive the signal through one port, but receives the signals through its first to eighth ports.

Accordingly, since the microcomputer 270 recognizes in advance the sensing unit subject to sensing, it performs a convergence control only by taking the signal of the corresponding port from the signals inputted through the first to eighth ports. Thus, even if any signal is inputted through any other port due to the external light, the microcomputer 270 ignores this signal.

As described above, the auto-convergence error preventing apparatus in a projection TV according to the present invention has the following effects:

First, even if the sensing unit subject to sensing operates due to an external light, in detecting the degree of mis-convergence using a control pattern when the auto-convergence is performed, the sensed signal is intercepted or ignored so that the microcomputer cannot recognize the sensed signal, and thus the degree of mis-convergence can be detected more accurately.

Second, by detecting the degree of mis-convergence more accurately as described above, a clear image of a high picture quality can be provided.

Third, as the clear image of a high picture quality is provided, a user's satisfaction with the product and the reliability thereof can be improved.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for preventing an auto-convergence error in a projection television receiver (TV) provided with a screen for displaying an image signal and first to eighth sensing units having first and second optical sensors for sensing a pattern displayed on the screen, the apparatus comprising:

first and second amplifying units for receiving and amplifying sensed values sensed by the first to fourth sensing units and the fifth to eighth sensing units with predetermined multiple amplification factors;

first and second comparators for receiving and comparing amplified values outputted from the first and second amplifying units;

an inverter for inverting output values of the first and second comparators;

an operation unit for AND-gating the outputs of the amplifying units and outputs of the inverter; and a microcomputer for receiving an output of the operation unit, judging a degree of convergence correction, and outputting a corresponding control signal.

2. The apparatus of claim 1, wherein the operation unit comprises:

an XOR operation unit for receiving and XOR-gating signals inputted to non-inverting (+) terminals of the first and second comparators; and an AND gate for receiving and AND-gating an output of the XOR operation unit and the output of the inverter.

3. An apparatus for preventing an auto-convergence error in a projection television receiver (TV) provided with a screen for displaying an image signal and first to eighth sensing units having first and second optical sensors for sensing a pattern displayed on the screen, the apparatus comprising:

a first amplifying unit for receiving and amplifying sensed values outputted through first optical sensors provided in the first to fourth sensing units and sensed values outputted through second optical sensors provided in the first to fourth sensing units;

a second amplifying unit for receiving and amplifying sensed values outputted through first optical sensors provided in the fifth to eighth sensing units and sensed values outputted through second optical sensors provided in the fifth to eighth sensing units;

a comparing unit for receiving and comparing amplified values outputted from the first and second amplifying units;

an inverter for inverting output values of the comparing unit;

a first operation unit for receiving and operating output values from all output terminals of the first and second amplifying units;

a second operation unit for receiving and operating output values of the first operation unit and the inverter; and a microcomputer for outputting a control signal for a convergence control in accordance with an output of the second operation unit.

4. The apparatus of claim 3, wherein the first amplifying unit comprises:

second, fourth, sixth and eighth amplifiers for receiving and amplifying the sensed values outputted through the first optical sensors in the first to fourth sensing units; and first, third, fifth and seventh amplifiers for receiving and amplifying the sensed values outputted through the second optical sensors in the first to fourth sensing units.

5. The apparatus of claim 3, wherein the second amplifying unit comprises: $10^{th}$, 12th, 14th and $16^{th}$ amplifiers for receiving and amplifying the sensed values outputted through the first optical sensors in the fifth to eighth sensing units; and $9^{th}$, $11^{th}$, $13^{th}$ and $15^{th}$ amplifiers for receiving and amplifying the sensed values outputted through the second optical sensors in the fifth to eighth sensing units.

6. The apparatus of claim 3, wherein the first operation unit receives and XOR-gates all the output values of the first and second amplifying units.

7. The apparatus of claim 3, wherein the second operation unit receives and AND-gates the outputs of the first operation unit and the inverter.

8. The apparatus of claim 3 wherein the second operation unit further comprises a latch for providing results of the AND-gating to the microcomputer.

9. An apparatus for preventing an auto-convergence error in a projection television receiver (TV) provided with a screen for displaying an image signal and first to eighth sensing units having first and second optical sensors for sensing a pattern displayed on the screen, the apparatus comprising:

an amplifying unit for amplifying sensed values outputted through the first to eighth sensing units, a comparing unit for receiving and comparing amplified values outputted from the amplifying unit, a first operation unit for receiving and AND-gating all output values of the comparing unit, a second operation unit for receiving and operating the signals inputted to non-inverting terminals of the comparing unit, an inverter for inverting outputs of the comparing unit, a third operation unit for receiving and AND-gating an output of the second operation unit and an output of the inverter, a D-type flip-flop for receiving an output of the third operation unit as its clock input and latching data, and a microcomputer for outputting a control signal for a convergence control in accordance with an output value of the D-type flip-flop.

10. The apparatus of claim 9, wherein the amplifying unit includes a first amplifying unit for receiving and amplifying sensed values outputted through the first optical sensors provided in the first to fourth sensing units and sensed values outputted through the second optical sensors provided in the first to fourth sensing units; and a second amplifying unit for receiving and amplifying sensed values outputted through first optical sensors provided in the fifth to eighth sensing units and sensed values outputted through second optical sensors provided in the fifth to eighth sensing units.

11. The apparatus of claim 10, wherein the comparing unit includes a first and a second comparing units for receiving and comparing the sensed values of the first to eighth sensing units which are outputted from the first and second amplifying units.

12. The apparatus of claim 10, wherein the second operation unit XOR-gates all outputs of the comparing unit.

* * * * *